United States Patent
Friedrich

(10) Patent No.: US 7,336,154 B2
(45) Date of Patent: Feb. 26, 2008

(54) METHOD FOR SELECTING ONE OR MORE TRANSPONDERS

(75) Inventor: Ulrich Friedrich, Ellhofen (DE)

(73) Assignee: Atmel Germany GmbH, Heilbronn (DE)

(*) Notice: Subject to any disclaimer, the term of this patent is extended or adjusted under 35 U.S.C. 154(b) by 369 days.

(21) Appl. No.: 10/903,721

(22) Filed: Jul. 30, 2004

(65) Prior Publication Data
US 2005/0024186 A1 Feb. 3, 2005

(30) Foreign Application Priority Data
Aug. 1, 2003 (DE) ................ 103 36 308

(51) Int. Cl.
*H04Q 5/22* (2006.01)
(52) U.S. Cl. .............. 340/10.2; 340/10.4; 340/10.3; 340/10.5
(58) Field of Classification Search ............. 340/10.2, 340/10.4, 10.41, 10.42, 10.3, 10.31, 10.5, 340/10.1; 235/435; 342/42, 44, 118, 126–128
See application file for complete search history.

(56) References Cited

U.S. PATENT DOCUMENTS

| 5,307,349 | A | | 4/1994 | Shloss et al. |
|---|---|---|---|---|
| 5,489,908 | A | | 2/1996 | Orthmann et al. |
| 5,541,928 | A | | 7/1996 | Kobayashi et al. |
| 5,594,429 | A | | 1/1997 | Nakahara |
| 5,751,570 | A | * | 5/1998 | Stobbe et al. ............ 700/11 |
| 5,811,885 | A | | 9/1998 | Griessbach |
| 5,841,770 | A | | 11/1998 | Snodgrass et al. |
| 5,856,788 | A | | 1/1999 | Walter et al. |
| 6,198,382 | B1 | | 3/2001 | Berger et al. |
| 6,265,962 | B1 | | 7/2001 | Black et al. |

(Continued)

FOREIGN PATENT DOCUMENTS

DE  101 61 302  7/2003

(Continued)

OTHER PUBLICATIONS

Automatic Identification—Radio Frequency Identification for Item Management, Part 6: Mode 6—Physical Layer, Anti Collision System and Protocols for Ultra High Frequency (UHF) Systems; Working Draft ISO/IEC WD 18000-6 Mode 3; Feb. 1, 2002; pp. 1 to 125.

(Continued)

*Primary Examiner*—Brian Zimmerman
*Assistant Examiner*—Nam Nguyen
(74) *Attorney, Agent, or Firm*—W. F. Fasse; W. G. Fasse

(57) ABSTRACT

One or more transponders are selected by a base station out of a plurality of transponders. For this purpose an identification bit sequence (IB) that is or includes a random number bit sequence (ZB) is made available in the respective transponder and the base station transmits in a bit-by-bit fashion a selection bit sequence (AB) to the transponders. These sequences (IB or ZB) and (AB) are compared bit-by-bit in the respective transponder. The comparing is performed by way of a predeterminable comparing criterion to provide a comparing result in the form of a selection bit to which a bit value is assigned. The selection is then made depending on the bit value of the selection bit of the respective transponder.

13 Claims, 2 Drawing Sheets

U.S. PATENT DOCUMENTS

| | | |
|---|---|---|
| 6,307,848 B1 | 10/2001 | Wood, Jr. |
| 6,321,982 B1 * | 11/2001 | Gaultier ................... 235/380 |
| 6,377,203 B1 | 4/2002 | Doany |
| 6,456,191 B1 | 9/2002 | Federman |
| 6,535,109 B1 * | 3/2003 | Mahdavi .................. 340/10.3 |
| 6,538,563 B1 * | 3/2003 | Heng ....................... 340/10.2 |
| 6,774,766 B1 | 8/2004 | Moyer |
| 6,963,270 B1 | 11/2005 | Gallagher, III et al. |
| 6,988,667 B2 * | 1/2006 | Stewart et al. ............. 235/492 |
| 7,009,526 B2 | 3/2006 | Hughes et al. |
| 7,023,356 B2 * | 4/2006 | Burkhardt et al. ..... 340/825.49 |
| 7,053,754 B2 * | 5/2006 | Mani ....................... 340/10.2 |
| 7,057,511 B2 * | 6/2006 | Shanks et al. ........... 340/572.1 |
| 2001/0014090 A1 | 8/2001 | Wood, Jr. |
| 2002/0188750 A1 | 12/2002 | Li |
| 2003/0061063 A1 | 3/2003 | Vacherand et al. |
| 2005/0083178 A1 | 4/2005 | Friedrich |
| 2005/0128130 A1 | 6/2005 | Friedrich |

FOREIGN PATENT DOCUMENTS

| | | |
|---|---|---|
| EP | 0 687 119 | 12/1995 |
| FR | 2805637 | 8/2001 |
| GB | 2340692 | 2/2000 |

OTHER PUBLICATIONS

Klaus Finkenzeller, "RFID-Handbuch", (RFID Handbook), 3$^{rd}$ Edition, Hauser publishers, 2002, pp. 203 to 224.

English Translation of Klaus Finkenzeller, "RFID-Handbuch", (RFID Handbook), 3$^{rd}$ Edition, Hauser publishers, 2002, pp. 203 to 224.

* cited by examiner

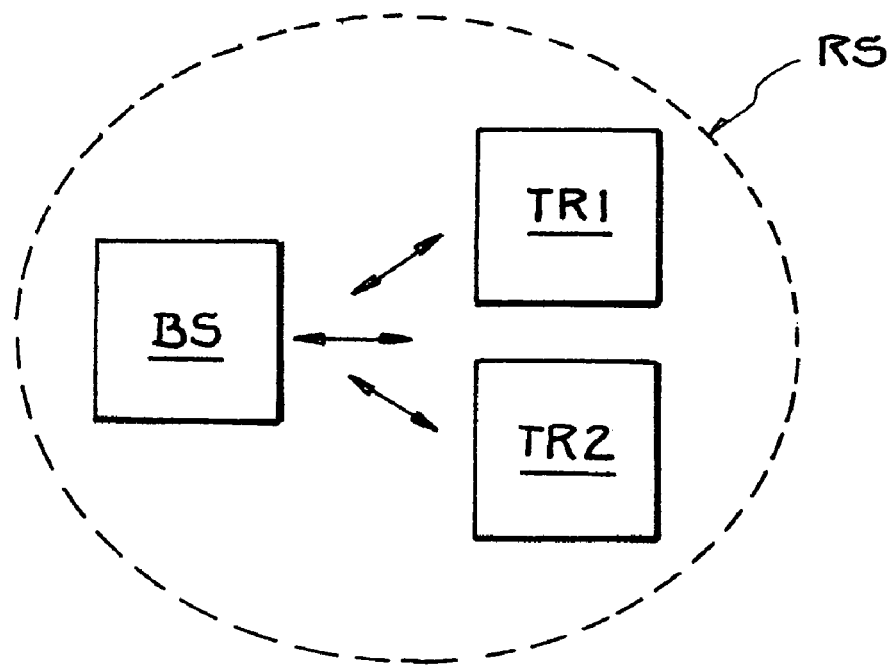
FIG.1
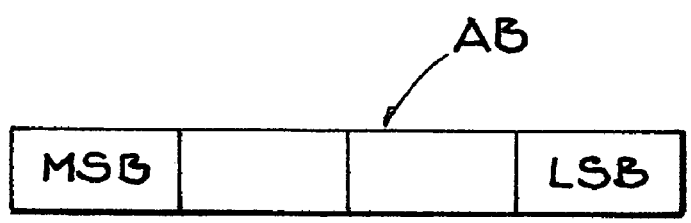
FIG.2
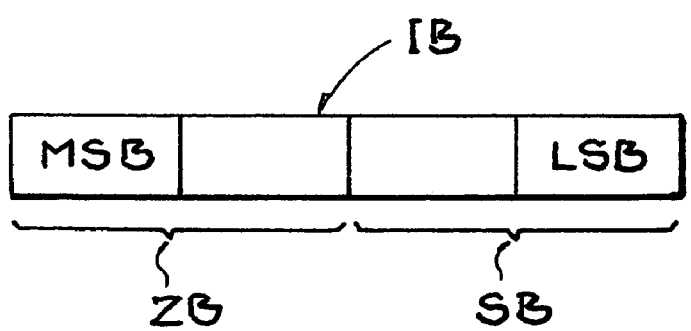

METHOD FOR SELECTING ONE OR MORE TRANSPONDERS

CROSS-REFERENCE TO RELATED APPLICATION

The present application is related to my copending application U.S. Ser. No. 10/969,433, filed on Oct. 19, 2004, entitled Method for Selecting One or Several Transponders.

PRIORITY CLAIM

This application is based on and claims the priority under 35 U.S.C. §119 of German Patent Application 103 36 308.4, filed on Aug. 1, 2003, the entire disclosure of which is incorporated herein by reference.

FIELD OF THE INVENTION

The invention relates to selecting with a base station, any one or more transponders out of a plurality of transponders, for example to retrieve information from the selected transponder or transponders.

BACKGROUND INFORMATION

Such selecting methods or procedures are, for example, used in stock maintenance systems. These procedures are referred to as anti-collision methods. Anti-collision methods are used, for example, in contactless identification systems or so-called radio frequency identification (RFID) systems. Such a system normally comprises a base station or a reading device and a plurality of transponders or remote sensors. These transponders or sensors are present simultaneously in the interrogation range or field of the base station. In case the data transmission is to take place between the base station and only one transponder or a particular group of transponders among all of the transponders, then a selection method must be performed prior to a respective data transmission to avoid collisions of simultaneous communications with several unselected transponders.

U.S. Pat. No. 5,856,788 (Walter et al.) describes a method and apparatus for radio frequency identification tags in which the transponders are selected by means of a bit-by-bit comparing of their identification bit sequence with a selection bit sequence. The identification bit sequence is unique or unambiguous and statically allocated. The selection takes place in a half-duplex method in which the base station interrogates the transponders by transmitting a selection bit and the transponders respond to the interrogation by transmitting a respective bit of their identification bit sequence if the respective bit corresponds to the requested selection bit value. The transponders compare the corresponding bit of their identification code bit sequence with the respective requested selection bit. The comparing takes place on the basis of a comparison criterion. The comparison criterium in the case of Walter et. al. is the "equal operator". More specifically, transponders remain activated if the associated or respective bit of their identification code bit sequence corresponds to the selection bit. Due to the half-duplex method a relatively long time is necessary until one transponder is selected.

The publication "ISO WD 18000-6 Mode 3" of Feb. 1, 2002, entitled "Automatic Identification-Radio Frequency Identification For Item Management" describes a selection method in which the selection also takes place on the basis of an unambiguous identification bit sequence. This conventional selection method operates as a full duplex method, whereby the time duration for the selection is reduced. The transponders are also selected by means of their unambiguous static allocation of the identification bit sequence.

The above described two conventional methods require that an unambiguous identification code bit sequence is allocated to each transponder within the interrogation range or field of the base station. The identification bit sequence is conventionally formed by a so-called unique identification (U-ID). Such U-ID is allocated to the transponders, for example when the transponders are manufactured. The definiteness or unambiguity of the U-ID can, however, not be always guaranteed due to the multitude of U-ID specifications in open systems.

OBJECTS OF THE INVENTION

In view of the foregoing it is the aim of the invention to achieve the following objects singly or in combination:
  to provide a method for selecting one or more transponders out of a plurality of transponders by a base station in such a way that the presence of an unambiguous, statically allocated identification code in the transponders is not absolutely necessary;
  to make the selection of one or more transponders possible even where the same U-IDs have been repeatedly assigned and statically allocated to a plurality of transponders within the interrogation field of the base station;
  to reduce the time required for the selection of one or more transponders; and
  to provide a method for selecting transponders, which method is particularly suitable for use in transponder based identification systems and in systems in which the transponders include remote sensors.

SUMMARY OF THE INVENTION

The invention further aims to avoid or overcome the disadvantages of the prior art, and to achieve additional advantages, as apparent from the present specification. The attainment of these objects is, however, not a required limitation of the present invention.

The above objects have been achieved according to the invention in a method of selecting one or more transponders from a plurality of transponders by a base station, the method comprising the following selection steps:
a) generating, respectively in each respective transponder of the plurality of transponders, a respective random number bit sequence comprising random bit values;
b) providing, respectively in each respective transponder, an identification bit sequence comprising the random number bit sequence of the respective transponder;
c) transmitting bit-by-bit a selection bit sequence that comprises selection bit values, from the base station to the plurality of transponders;
d) comparing bit-by-bit, respectively in each respective transponder, corresponding bits of the identification bit sequence of the respective transponder with corresponding bits of the selection bit sequence, wherein the comparing is carried out using a predetermined comparison criterion to provide a comparison result;
e) in each respective transponder, respectively allocating to a transponder selecting indicator bit for the respective transponder a transponder selecting indicator bit value according to and depending on the comparison result;

f) respectively selecting one or more of the transponders in response to and depending on the transponder selecting indicator bit value allocated to the transponder selecting indicator bit of each transponder respectively;

g) prior to the respective bitwise comparing of the corresponding bit of the identification bit sequence of the respective transponder with the corresponding bit of the selection bit sequence in the step d), transmitting a respective bit value of the respective corresponding bit of the identification bit sequence from the respective transponder to the base station; and h) generating at least one of the selection bit values of the selection bit sequence in the base station in response to and depending on at least one respective bit value of the respective corresponding bit of the identification bit sequence received by the base station from the respective transponder.

According to the invention a random number bit sequence is generated in each transponder. The random number bit sequence is used either directly as an identification bit sequence or the random number bit sequence is incorporated into an identification bit sequence so that the latter contains the random number bit sequence. Thus, the identification bit sequence can be the random number bit sequence or the identification bit sequence may comprise other components in addition to the random number bit sequence. The random number bit sequence may be inserted in any area or region of the identification bit sequence, preferably at the beginning of the identification bit sequence. The selection with the aid of the random number bit sequence makes it possible to use a bit-by-bit selection or selecting method even in open systems in which the same identification bit sequences may be present or contained statically in several transponders at the same times.

According to a further embodiment of the present method, the comparing or comparison criterion is transmitted by the base station to the transponders, whereby the selection under variable selection conditions is simplified.

According to a further embodiment of the invention the comparing criterion depends on the bit position of the bits to be compared in the identification bit sequence and the selection bit sequence. This feature of the invention makes it possible to provide a flexible selection even under complex selection conditions.

In a further embodiment of the invention the comparing criterion is an arithmetic operator, particularly the "larger operator", the "smaller operator" or the "equal operator". Comparing criteria are easily realized in a simple manner with the aid of arithmetic operators.

According to a further embodiment of the invention the identification bit sequence comprises a static bit sequence component which is either allocated to the transponder when the transponder is being manufactured, or it is programmed into the transponder after manufacturing. The programmed bit sequence component can, for example, be stored in a ROM or in an EEPROM of the transponder. In this manner it becomes possible to include in the selection method data structures that are either specific to the manufacture of the transponder or they are specific to the user who may program the transponder in accordance with the user's requirements. According to the method according to the invention an unambiguous selection of the transponder or transponders is possible even if their static, allocated identification bit sequence or bit sequence component are equal. Another advantage of the invention is seen in that it makes possible the use of conventional, static identification bit sequences which are conventionally used in closed systems, also in open systems.

According to a further embodiment of the invention the selection operation is performed repeatedly, whereby transponders which have been selected in the immediately preceding selection process no longer participate in the next following selection processes. This feature makes possible the sequential selection of individual transponders or groups of transponders.

It is another advantage of the invention that those transponders which are still participating in the selection processes, generate a new random number bit sequence which is then contained in the identification bit sequence. This feature reduces the probability that the random number bit sequences or the identification bit sequences of the remaining transponders are identical.

According to a further embodiment of the present method, the respective transponder transmits to the base station a bit value of the corresponding bit of the identification bit sequence of the respective transponder. This transmission takes place prior to the bit-by-bit comparing of the respective bits of the identification bit sequence with the selection bit sequence. This transmission of the bit value from the transponders to the base station reduces the number of the required selection steps for selecting all desired transponders.

According to yet another embodiment of the invention the base station adjusts the selection bit sequence, depending on the identification bit sequence received by the base station. This feature makes possible the targeted selection of the transponders that are present within the interrogation field or range of the base station.

BRIEF DESCRIPTION OF THE DRAWINGS

In order that the invention may be clearly understood, it will now be described in connection with example embodiments thereof, with reference to the accompanying drawings, wherein:

FIG. 1 shows, in block form, an RFID-system with a base station and two transponders;

FIG. 2 shows a selection bit sequence and an associated identification bit sequence with a random number bit sequence area or region and a static bit sequence area or region;

Figure 3:
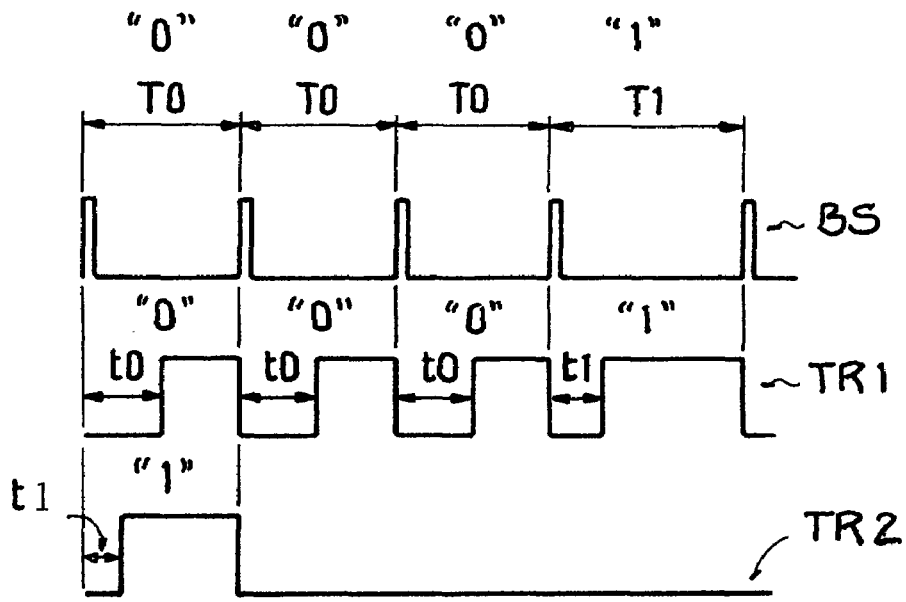
FIG. 3 shows a pulse diagram illustrating, as a function of time, a selection bit sequence transmitted by the base station for the selection of a first transponder and the associated information bit sequences transmitted by the transponders to the base station shown in FIG. 1.

DETAILED DESCRIPTION OF A PREFERRED EXAMPLE EMBODIMENT AND OF THE BEST MODE OF THE INVENTION

FIG. 1 shows an RFID-system RS with a base station BS and two transponders TR1 and TR2 as are used, for example in stock maintenance applications or systems. The base station emits electromagnetic carrier waves for the data transmission. The base station modulates these carrier waves in accordance with the informations to be transmitted. The transponders TR1 and TR2 modulate the carrier waves received by the transponders by changing the input impedance of the transponder receiver for then transmitting data from the transponders TR1 and TR2 to the base station BS.

Such stock maintenance applications may involve or comprise an open system. Stated differently, any number of transponders may be present in the interrogation field or range of the base station BS, whereby the static identification bit sequence of all of these transponders may be identical. This static identification bit sequence may, for example be a U-ID allocated to the transponders when the transponders are manufactured. At the beginning or in the starting state of the RFID system the number of the transponders present in the interrogation field or range of the base station is not known to the base station. Similarly, the static identification bit sequences which have been allocated or associated with the transponders TR1 and TR2 during their manufacture are not known to the base station at this time.

In order to transmit data from the transponders TR1 and TR2 to the base station BS the latter must determine the presence of the transponders TR1 and TR2 in the interrogation field or range of the base station and then the base station must select with the aid of a selection process one of the transponders TR1 or TR2. Following a selection the base station BS can perform a writing or reading operation with the selected transponder TR1 or TR2.

FIG. 2 shows a selection bit sequence AB and an associated identification bit sequence IB with a random number bit sequence area ZB and a static bit sequence area SB which are used for the selection of one of the transponders TR1 or TR2. The highest value bit MSB of the respective bit sequence AB or IB is positioned to the left while the lowest value bit LSB is positioned to the right. A random number sequence area ZB is filled in the transponders TR1 and TR2 respectively with a random number bit sequence which is generated, for example by a random number generator such as a linear, feedback coupled shift register, not shown. For this example embodiment it is assumed that the transponders TR1 and TR2 comprise identical values in their respective static bit sequence area SB. Thus, the above described, conventional bit-by-bit selection method would not be able to separately address or interrogate the transponders TR1 and TR2.

The base station BS emits an initial order for selecting one of the transponders TR1 or TR2. This initial order starts the selection process. At this point of time the random number or random number bit sequence present at the respective random number generator is recorded in the corresponding random number bit sequence area ZB of the transponder TR1 and TR2.

FIG. 3 shows how all transponders TR1 and TR2, following the initial order from the base station, simultaneously transmit to the base station a respective bit value of their highest value bit MSB from their random number bit sequence area ZB in the identification bit sequence IB. The transponder TR1 transmits the bit value "0" and the transponder TR2 transmits the bit value "1".

The encoding of the respective transponder bit values by the transponders TR1 and TR2 takes place by allocating or assigning a time duration to the transponder bit values. Thus, t0 is allocated or assigned to the bit value "0" and "t1" is allocated or assigned to the bit value "1" of a backscatter signal from the transponders until a modulation change occurs relative to a synchronization marker emitted by the base station BS. This synchronization marker may, for example, be produced by a modulation change of the carrier signal that is emitted by the base station BS.

The base station BS receives the backscattered signals with the encoded transponder bit values from the transponders and can recognize on the basis of the encoding which bit values have been transmitted and whether different bit values are present. The base station BS transmits, on the basis of the received bit values, a first selection bit with the bit value "0" to the transponders TR1 and TR2. The encoding of the selection bit value of the respective selection bit in the base station is represented by a time duration between two synchronization markers. A time duration t0 is allocated or assigned to the selection bit value "0" and a time duration t1 is allocated or assigned to the selection bit value "1" of the selection bit.

A comparing between the first selection bit and the respective highest value bit from its random number bit sequence area ZB now takes place in the transponders TR1 and TR2. The comparing is performed on the basis or by means of a comparing criterion. The comparing criterion which was transmitted together with the initial order is, in this case, an "equal operator".

Since the bit value of the selection bit and of the corresponding bit of the random number bit sequence of the first transponder TR1 are equal to each other, a final transponder selection bit is set to the value "selected". Thus, the transponder TR1 continues to participate in the selection process. Since the respective bit values of the random number sequence of the second transponder TR2 differ from the selection bits, a final transponder selection bit of the second transponder is set to the value "not selected", whereby the second transponder changes over into a standby operating status, thereby no longer participating in the current selection process. The comparing is now performed correspondingly in a bit-by-bit fashion for all bits of the identification bit sequence IB of the first transponder TR1. Since, in the illustrated example, there is respectively a match of the selection bit with the corresponding bit of the identification bit sequence IB, the first transponder TR is or remains selected. The base station BS can now perform a writing operation and/or a reading operation with the selected first transponder.

Figure 4:
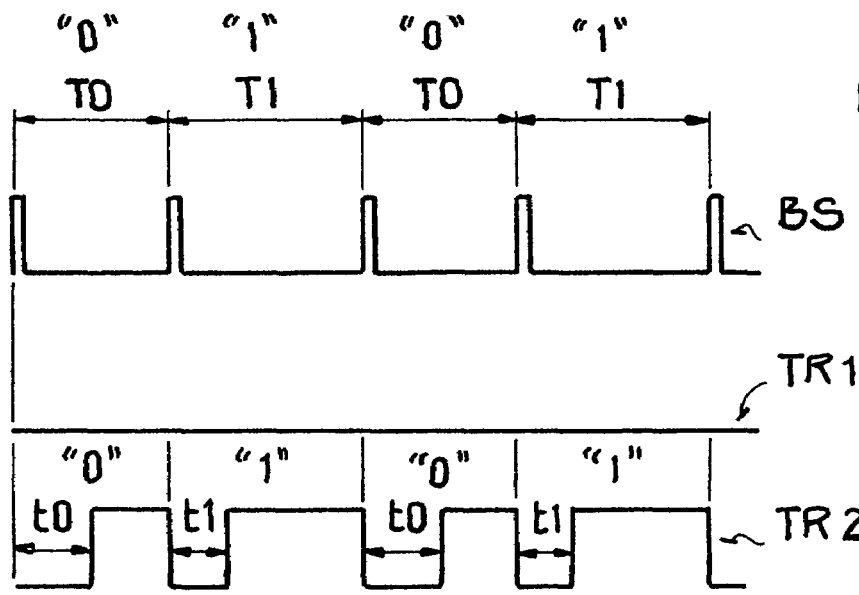
FIG. 4 illustrates a pulse diagram as a function of time of a second selection bit sequence transmitted by the base station for selecting a second transponder and the associated information bit sequence transmitted by the transponders to the base station shown in FIG. 1.

FIG. 4 shows a following selection of the second transponder TR2 by a repetition of the selection process. The base station BS transmits again a starting or initial order for initiating the repeated selection process, whereby the second selection process is started. The second transponder TR2 produces a new random number bit sequence ZB in response to the repeated starting order. Since the first transponder TR1 was already selected in the first selection process, the second transponder now switches into the stillstand or standby operational state and no longer participates in the selection process as shown in FIG. 4. The second transponder TR2 now transmits in bit-by-bit fashion its identification bit sequence, whereupon the base station transmits a respective selection bit to the transponder TR2, said transmitted selection bit having an equal bit value. The selection bit of the second transponder thus exhibits, following the transmission of all identification bits, the value "selected", whereupon the base station BS can perform a writing and/or reading operation with the second transponder TR2.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of selecting one or more transponders from a plurality of transponders by a base station, said method comprising the following selection steps:
    a) generating, respectively in each respective transponder of said plurality of transponders, a respective random number bit sequence comprising random bit values;
    b) providing, respectively in each said respective transponder, an identification bit sequence comprising said random number bit sequence of said respective transponder;
    c) transmitting bit-by-bit a selection bit sequence comprising selection bit values, from said base station to said plurality of transponders;
    d) comparing bit-by-bit, respectively in each said respective transponder, corresponding bits of said identification bit sequence of said respective transponder with corresponding bits of said selection bit sequence, wherein said comparing is carried out using a predetermined comparison criterion to provide a comparison result;
    e) in each said respective transponder, respectively allocating to a transponder selecting indicator bit for said respective transponder a transponder selecting indicator bit value according to and depending on said comparison result;
    f) respectively selecting one or more of said transponders in response to and depending on said transponder selecting indicator bit value allocated to said transponder selecting indicator bit of each said transponder respectively;
    g) prior to said respective bit-wise comparing of said corresponding bit of said identification bit sequence of said respective transponder with said corresponding bit of said selection bit sequence in said step d), transmitting a respective bit value of said respective corresponding bit of said identification bit sequence from said respective transponder to said base station; and
    h) generating at least one of said selection bit values of said selection bit sequence in said base station in response to and depending on at least one said respective bit value of said respective corresponding bit of said identification bit sequence received by said base station from said respective transponder.

2. The method of claim 1, further comprising transmitting said predetermined comparison criterion from said base station to said transponders.

3. The method of claim 2, further comprising varying said comparison criterion dependent on a respective bit position of bits of said identification bit sequence and of bits of said selection bit sequence that are to be compared with one another.

4. The method of claim 1, further comprising selecting said predetermined comparison criterion as an arithmetic operator.

5. The method of claim 4, wherein said arithmetic operator is selected as any one of a larger-than operator, a smaller-than operator and an equal-to operator.

6. The method of claim 1, wherein said identification bit sequence comprises, in addition to said random number bit sequence, a static bit sequence portion which is respectively assigned to said transponders when said transponders are manufactured.

7. The method of claim 1, further comprising repeatedly performing said selection steps in successive selection processes, and omitting from a subsequent one of said selection processes transponders that have been selected in a preceding one of said selection processes.

8. The method of claim 7, further comprising generating in a respective one of said transponders still participating in said subsequent selection process, a new random number bit sequence and including said new random number bit sequence in said identification bit sequence.

9. The method of claim 1, further comprising encoding said random bit values of said random number bit sequence by assigning a time duration t0 to a random bit value "0" and assigning a time duration t1 to a random bit value "1".

10. The method of claim 9, wherein said encoding of said random bit values is performed in said transponders.

11. The method of claim 9, further comprising encoding said selection bit values of said selection bit sequence by assigning a time duration T0 to a selection bit value "0" and assigning a time duration T1 to a selection bit value "1", wherein T0 is greater than t0 and t1, and wherein T1 is greater than t0 and t1.

12. The method of claim 11, wherein said encoding of said selection bit values is performed in said base station.

13. The method of claim 11, wherein said encoding of said selection bit values is represented by a time duration of a time slot between two synchronization markers.

* * * * *